United States Patent [19]
Roethig

[11] Patent Number: 5,835,380
[45] Date of Patent: Nov. 10, 1998

[54] SIMULATION BASED EXTRACTOR OF EXPECTED WAVEFORMS FOR GATE-LEVEL POWER ANALYSIS TOOL

[75] Inventor: Wolfgang Roethig, San Jose, Calif.

[73] Assignee: LSI Logic Corporation, Milpitas, Calif.

[21] Appl. No.: 661,888

[22] Filed: Jun. 11, 1996

[51] Int. Cl.$^6$ .................................................. G06F 17/50
[52] U.S. Cl. .......................................... 364/488; 364/578
[58] Field of Search ................................... 364/488, 489, 364/490, 491, 578

[56] References Cited

U.S. PATENT DOCUMENTS

| | | | |
|---|---|---|---|
| 5,446,676 | 8/1995 | Huang et al. | 364/578 |
| 5,473,548 | 12/1995 | Omori et al. | 364/489 |
| 5,487,017 | 1/1996 | Prasad et al. | 364/488 |
| 5,515,302 | 5/1996 | Horr et al. | 364/578 |
| 5,535,370 | 7/1996 | Raman et al. | 364/490 |
| 5,553,008 | 9/1996 | Huang et al. | 364/578 |
| 5,598,348 | 1/1997 | Rusu et al. | 364/491 |
| 5,612,636 | 3/1997 | Ko | 364/489 |
| 5,612,892 | 3/1997 | Almulla | 364/489 |
| 5,625,803 | 4/1997 | McNelly et al. | 364/578 |
| 5,648,910 | 7/1997 | Ito | 364/490 |

OTHER PUBLICATIONS

R. Marculescu, D. Marculescu and M. Pedgram, "Efficient Power Estimation for Highly Correlated Input Streams", 32nd Design Automation Conference, pp. 628–634, Jun. 1995.

F. Najm, S. Goel and I. Hajj, "Power Estimation in Sequential Circuits", 32nd Design Automation Conference, pp. 635–640, Jun. 1995.

H. Mehta, M. Borah, R. Owens and M. Irwin, "Accurate Estimation of Combinational Circuit Activity", 32nd Design Automation Conference, pp. 618–622, Jun. 1995.

EPIC PowerMill User Manual Release 3.3, pp. iii–iv, 1995.

Design Power Version 3.2, Synopsys, Inc. 4 pp. 1994.

Appendix G, "Comparison of the C–MDE and Verilog Simulators", LSI Toolkit User's Guide, Release 1.3, LSI Logic Corporation, pp. G–1 through G–5, 1994.

Chapter 19, "Value Change Dump File", Verilog XL Reference, pp. 19–1 through 19–7, Mar. 1994.

Najm, Farid N.; Burch, Richard; Yang, Ping; Hajj, Ibrahim N., "Probabilistic Simulation for Relability Analysis of CMOS VLSI Circuits," IEEE Transactions on Computer–Aided Design, vol. 9, No 4, Apr. 1990.

*Primary Examiner*—Vincent N. Trans
*Attorney, Agent, or Firm*—Marger, Johnson, McCollom & Stolowitz, P.C.

[57] ABSTRACT

A simulation based power analysis tool extracts "expected" current waveforms from simulation results. These expected waveforms are then used to represent the power consumption for a corresponding circuit cell or groups of cells from which the waveform is derived. The expected waveform is a statistical representation of a current derived over a number of cycles. The expected waveform is derived by recording the starting time of each power arc with respect to a tool defined clock period. The width of the waveform is derived from the average current, propagation delay and intrinsic delay for arc. The expected waveform can take several forms depending on the accuracy required. Each form has a corresponding memory storage requirement. The starting time for each arc can be stored, which yields the most accurate "true" expected waveform. Alternatively, the minimum, maximum and average starting times for a given power arc can be stored from which a "weighted min-max" expected waveform can be constructed. This weighted expected waveform is less accurate than the "true" expected waveform but requires less memory to store the starting times. Alternatively, just the average starting time for the arc can be stored from which an "average" expected waveform can be formed. This form of the expected waveform requires the least amount of memory, but also the least accurate of the three.

26 Claims, 13 Drawing Sheets

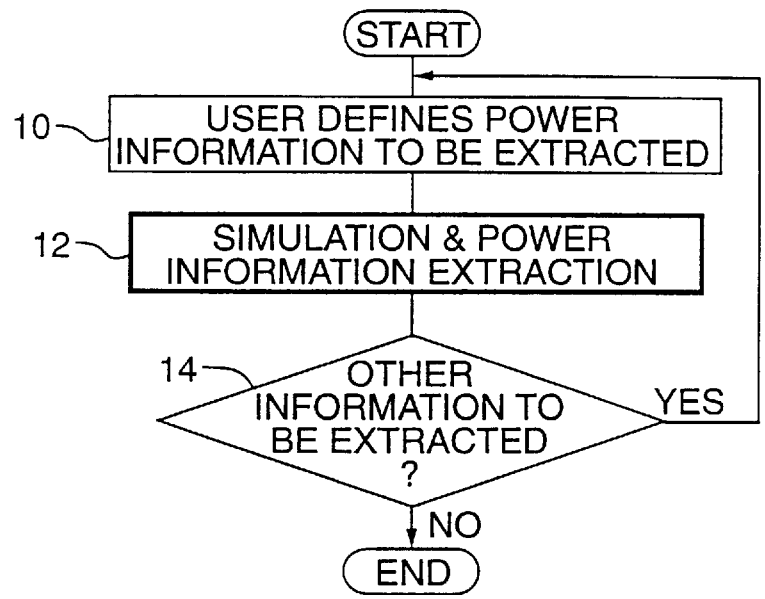
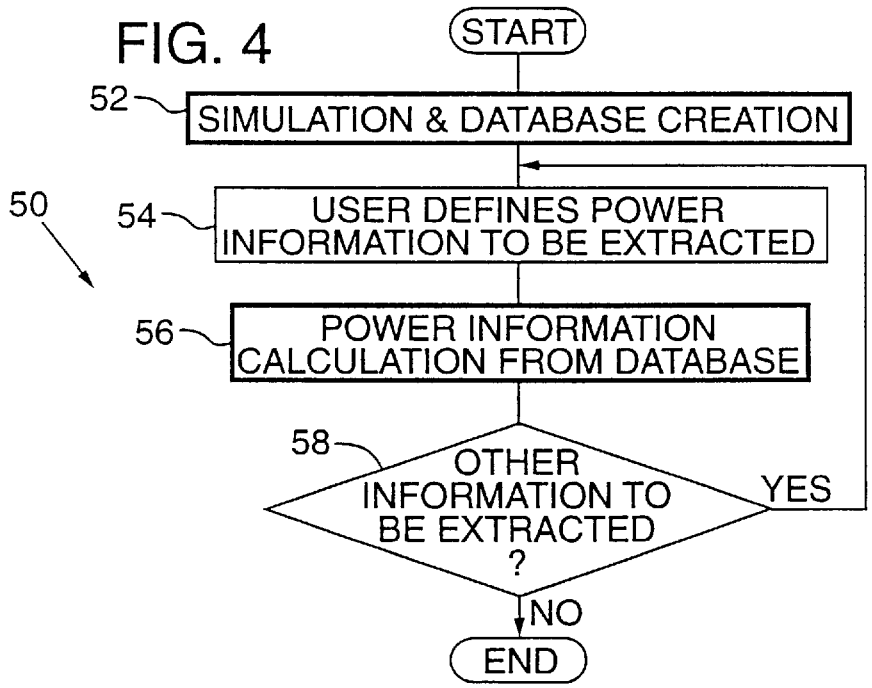

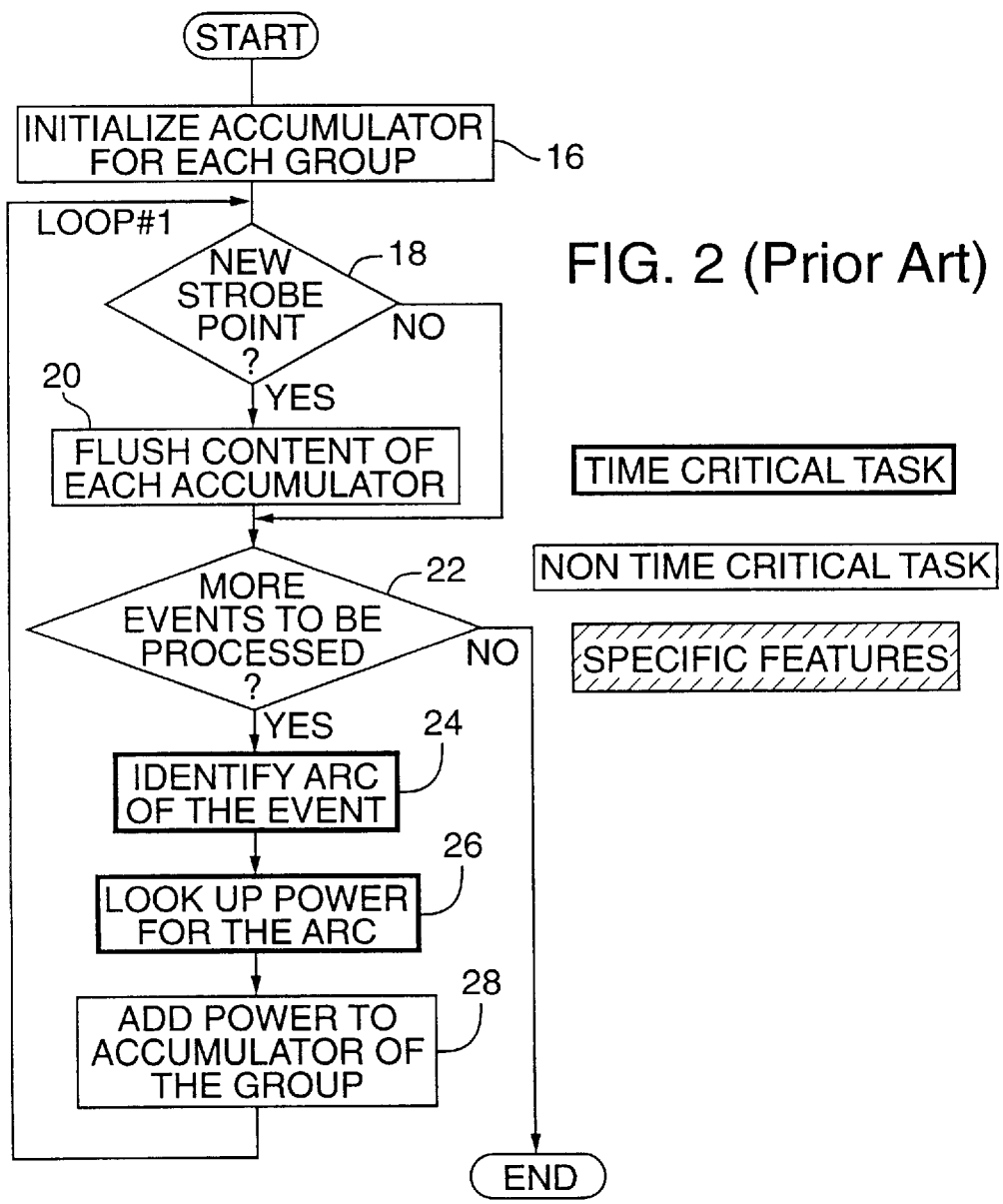

SIMULATION BASED EXTRACTOR OF EXPECTED WAVEFORMS FOR GATE-LEVEL POWER ANALYSIS TOOL

BACKGROUND OF THE INVENTION

This invention relates generally to electronic circuits and more particularly to power analysis tools therefor.

Power consumption in digital circuits, and in particular integrated circuits, is becoming an increasing problem as circuit density and operating speeds continue to increase. In general, power consumption within an integrated circuit is directly proportional to the clock frequency and the circuit density. As these two parameters continue to rise, tools are required to aide the circuit designer in quantifying the power consumption within the chip at a macro level and, preferably, identifying problem areas or "hot spots" in the circuit that could compromise the integrity of the design due to, for example, electromigration.

Current tools take two divergent approaches to power analysis on circuit designs. Unlike timing analysis, which is now focused on static, i.e., vector-independent approaches, these power analysis tools are simulation-based. The first approach calculates a toggle rate for each net. This toggle rate is then used in conjunction with the corresponding net capacitance to calculate an average power consumption attributable to this net. The power consumption for all of the nets within a given area of the design can then be added together to compute an average power estimate for that portion of the design. This approach is used in tool Synopsys DesignPower. Tools like EPIC PowerMill, on the other hand, perform transistor-level simulation and deliver waveforms of the power supply currents versus time. This second approach generates much more accurate power analysis, which can be used to verify the reliability of the design in post-layout.

Existing gate level power analysis tools are based on the notion of a power arc. A power arc is a predefined transition on a cell output due to a corresponding transition on one of the cell's inputs. In this way, different power consumption can be associated with different logical transitions in the cell. A unique average power figure is typically stored for each power arc from which the peak power can be derived based on the actual loading and simulation conditions, e.g., clock speed.

A control flow diagram of these prior art power analysis tools is shown in FIG. 1. In these conventional gate level power analysis tools, the user first defines the relevant area or portion of the circuit under consideration. This is either done textually by listing the component names and/or net names under consideration or graphically by highlighting a portion of the circuit. Next, a simulation is performed on the circuit using the conventional logic simulator. During this time, the power information is extracted based on the parameters specified by the user. This sequence continues until all of the required information is extracted. One obvious problem with this control flow is that the step of extracting the power information adversely impacts the simulation time, which is typically the critical path in the design loop.

Another problem with this approach is that once the power information is extracted, it is combined in such a way that much of the lower level information about the source of the power is lost. Referring now to FIG. 2, the more detailed control flow diagram is shown which illustrates how this information is lost. Conventional gate level power analysis tools use an accumulator for each group of cells for which the power is being calculated. The accumulator represents the power averaged over a given time period measured between one strobe point to the next. Thus, in step 18 the tool checks to see whether a new strobe point has occurred. If so, the contents of each accumulator is flushed in 20. If not, the tool checks to see in 22 whether more simulation events are made to be processed. If so, the tool identifies a power arc associated with the simulation event. For purposes of power estimation, it is important to know which arc corresponds to a given simulation event because each arc has an associated power consumption, which is determined in 26. This associated power is a function of the ramptime of the transition as well as the loading on the output. These two parameters can be used indexed into a power data library (described further below) to determine the corresponding power for the identified art. Once the power for the arc is known, that power is added to the accumulator of the user-specified group. This sequence of steps is continued until all of the simulation events are processed. Again, steps 24 and 26 are time-critical tasks that delay the simulation.

Referring now to FIG. 3, a data flow diagram of prior art power analysis tool is shown. The tool is based on a simulator 30 that provides a stimulus to a circuit defined by a netlist and delay file 32 and generates simulation events in a known manner. The heart of the conventional power analysis tool is a power information extractor 34 that receives timing dependency of simulation events from the netlist and delay file 32, simulation events from simulator 30, ramptime and load information from ramptime and load file 36 and power information from a power data library 38, which includes power look-up tables. The power information extractor 34 uses the timing dependencies of simulation events from the netlist and delay file to identify the power arcs produced by the simulation events. A power arc identifier 40 produces a power arc occurrence based on this information that is fed to a power calculator 42 which computes a power per arc figure using the ramptime and load information from the file 36 and the power data information from the power look-up tables stored in library 38. The power calculator 42 uses the ramptime and load information associated with a given net to index into the power look-up tables to locate a corresponding average current. A peak current can then be calculated by dividing the peak current by relevant time period.

This peak current, referred to as power per arc in FIG. 3, is fed to a power accumulator 44 which combines the peak currents for all of the arcs within a user-specified group as defined by the user set-up file 46. The power accumulator 44 adds these peak currents together to form an average power FIG. 46 for the user-specified group. Although this approach yields acceptable accuracy at the group level, all of the cell level information is lost in computing the average power for the group. Moreover, the new simulation must be run if a different grouping is specified by the user. This further protracts the design loop.

Accordingly, a need remains for a power analysis tool that allows the circuit designer to analyze different portions of the design without having to redo the simulation.

SUMMARY OF THE INVENTION

It is, therefore, an object of the invention to perform power analysis on user defined portions of a simulated circuit without having to rerun the simulation.

Another object of the invention is to reduce the amount of memory required to perform power analysis.

A further object of the invention is to reduce the computational complexity of power analysis.

A power analysis tool according to the invention includes a power arc identifier that extracts power arc information from simulation results including the occurrence time of each arc. These occurrence times are then stored in an arc occurrence database on which power analysis can be performed after the simulation has occurred. This allows a user to specify different circuit groupings on which to perform power analysis without requiring the circuit to be resimulated.

The tool according to the invention also includes a power calculator that converts average current, propagation delay, and intrinsic delay stored in a power data library into positive load current and negative load current for a cell. From these currents an "internal cell" current is derived which is related to the two load currents by a formula. Decomposing the cell currents into load currents and internal cell currents permits more accurate power analysis, thereby allowing the circuit designer or router to modify the design to better accommodate the power consumption by either using a lower power cell to reduce the internal cell current or change the loading on the cell to reduce the loading current.

The cell currents are grouped together by a power group processor based on the occurrence times of the arcs as stored in the arc occurrence database. The internal cell currents for a given cell are combined together as are the positive and negative load currents. The currents from various cells can then be combined in any manner according to user defined groupings. From these combined currents the Vdd and Vss current waveforms are formed. These Vdd and Vss currents can then be used to identify "hot spots" that may produce electromigration. The designer or router can then modify the design to eliminate these hot spots.

In another aspect of the invention, the tool includes an "expected waveform generator." This waveform generator can be used in conjunction with the above mentioned power analysis tool or with existing tools. The expected waveform generator represents current by a statistical waveform derived over a number of cycles rather a unique current waveform for each cycle. This "expected" waveform significantly reduces the amount of memory required to process power information extracted from simulation results. The expected waveform can take a number of different forms according to the invention including a "true" expected waveform, a "weighted min-max" expected waveform, or an "average" expected waveform. The former has the advantage of higher accuracy while the latter lower memory requirement, with the middle form falling between the two in terms of accuracy and complexity.

An advantage of the invention is that circuit designers and routers can easily conduct "what if" scenarios with respect to power analysis without having to perform a time and computationally intensive computer simulation each time.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a control flow diagram of a prior art power analysis tool.

FIG. 2 is a more detailed control flow diagram of the prior art power analysis tool of FIG. 1.

FIG. 4 is a control flow diagram of the power analysis tool according to the invention.

DETAILED DESCRIPTION

Referring now to FIG. 4, a control flow diagram of a gate level power analysis tool according to the invention is shown generally at 50. The difference between the power analysis tool 50 according to the invention and the prior art power analysis tool as shown in FIG. 1 is that the simulation step 52 is moved outside of the loop in which the power information is calculated. Once the simulation step 52 is complete, the user defines the power information to be extracted in 54 and that power information is calculated from a database in 56. Steps 54 and 56 are then repeated until all of the power information is extracted. This process is repeated independent of the simulation. Moreover, the user can change the user's specified power information that is extracted in step 54 and that information can then be actually extracted in 56 without having to rerun the simulation. That is, once the simulation is run, the user can analyze any different level within the design without having to rerun the simulation.

Figure 5:
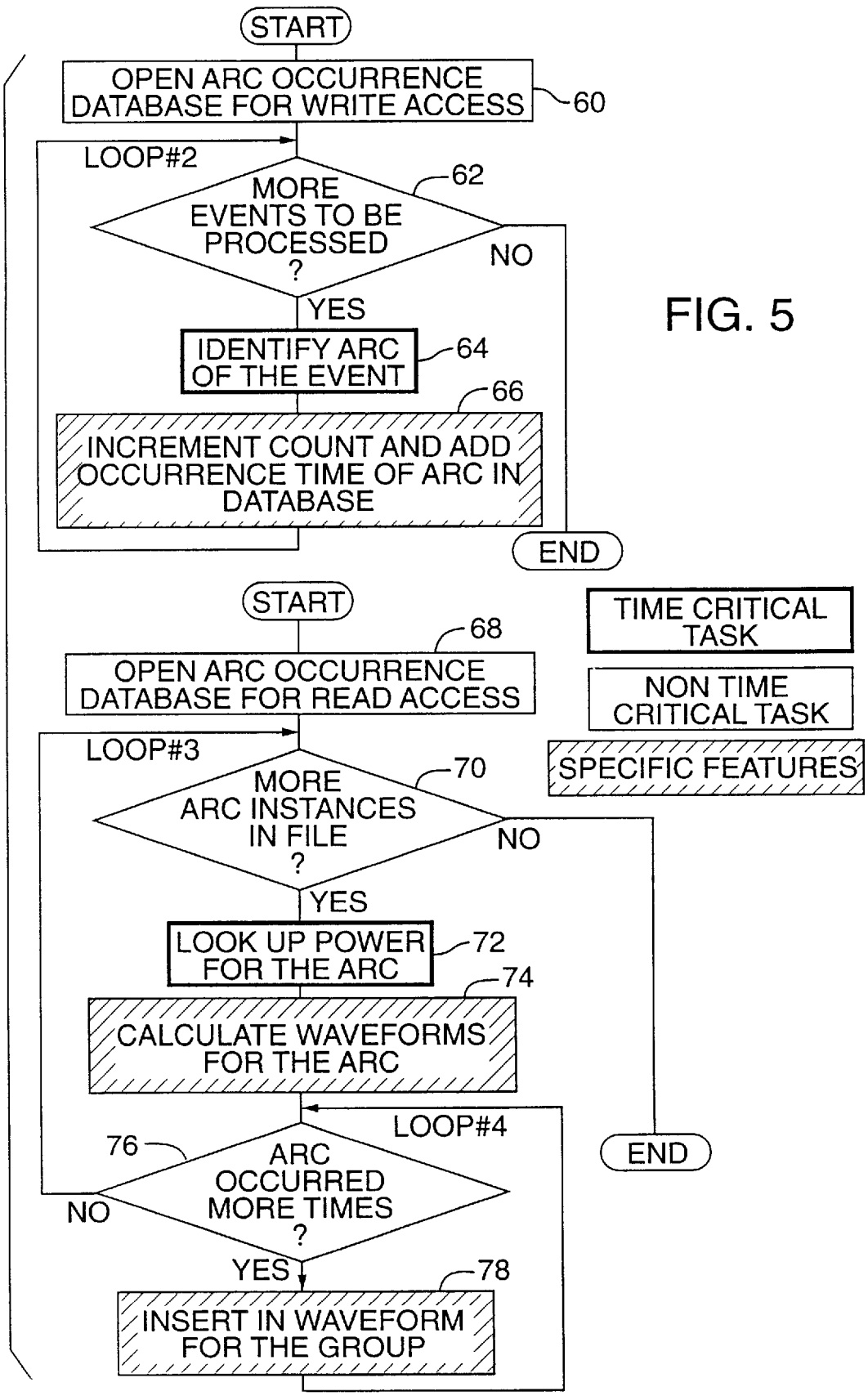
FIG. 5 is a more detailed control flow diagram of the power analysis tool of FIG. 4.

In addition to the normal simulation results generated in step 52, the power analysis tool also creates a power arc occurrence database that is used in step 56 to extract the desired power information. The creation of this database and the contents thereof is shown in the more detailed control flow diagram of FIG. 5. As shown in FIG. 5, the first step is to open the arc occurrence database for right axis in step 60. Once the database is opened, the power analysis tool checks to see whether there are any simulation events that have yet to be processed in 62. If there are additional simulation events, the tool identifies the arc associated with that simulation event in 64. This is essentially the same step as the step 24 described above. Instead of calculating the power associated with this arc, however, the power analysis tool according to the invention increments a counter associated with the identified arc and stores an occurrence time of the arc in the database. Thus, the database holds information regarding the number of times that the power arc occurred and when each of these power arcs occurred. Steps 62, 64 and 66 (loop#2) are then repeated until all of the simulation events are processed.

The manner in which the power arc occurrence database created in step 52 is used is also shown in FIG. 5. These steps (68–76) are executed as part of step 56 described above with reference to FIG. 4. The first step 68 is opening the power arc occurrence database for read access. Once the database is open, the tool begins going through each arc instance in the database file. For each arc instance in the file, the tool looks up the power associated with the arc in step 72. In the preferred embodiment, this is an average current that is a function of the ramptime and load associated with the net driven by the arc.

Once this average current is known, an atomic waveform is calculated for that particular arc in step 74. The atomic waveforms model the positive, negative and internal load current associated with the cell. The waveforms representing these currents are then combined in such a way to represent the Vdd and Vss currents consumed by the cell. These atomic waveforms are piece-wise rectangular waveforms whose pulsewidth is determined by the ramptime and whose peak is a function of the average current determined in step 72. The manner in which these waveforms are constructed is discussed in further detail below.

If the arc identified in step 70 occurred more times, as indicated by the power arc occurrence database, step 78 is repeated for each additional occurrence thereof. In step 78, the primitive waveform for each instance is combined together to form a combined waveform for the arc. Once all of the instances for the particular arc have been exhausted, step 76 transitions back to step 70 where the tool checks for any more arc instances in the arc occurrence database file. If there are additional instances, steps 72 and 74 are repeated for each of these additional arc instances in the file. If, on the other hand, there are no more instances, the flow is complete.

Figure 3:
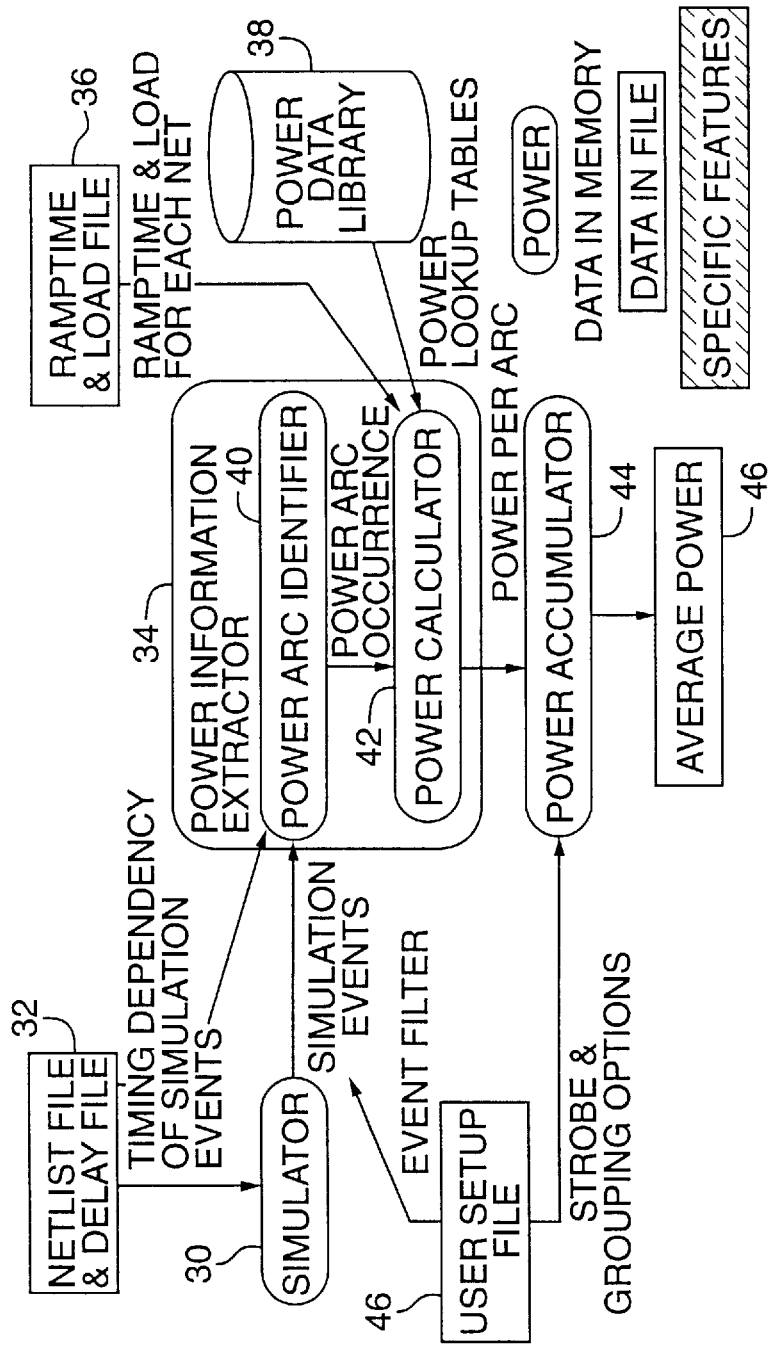
FIG. 3 is a data flow diagram of the power analysis tool of FIG. 1.
Figure 6:
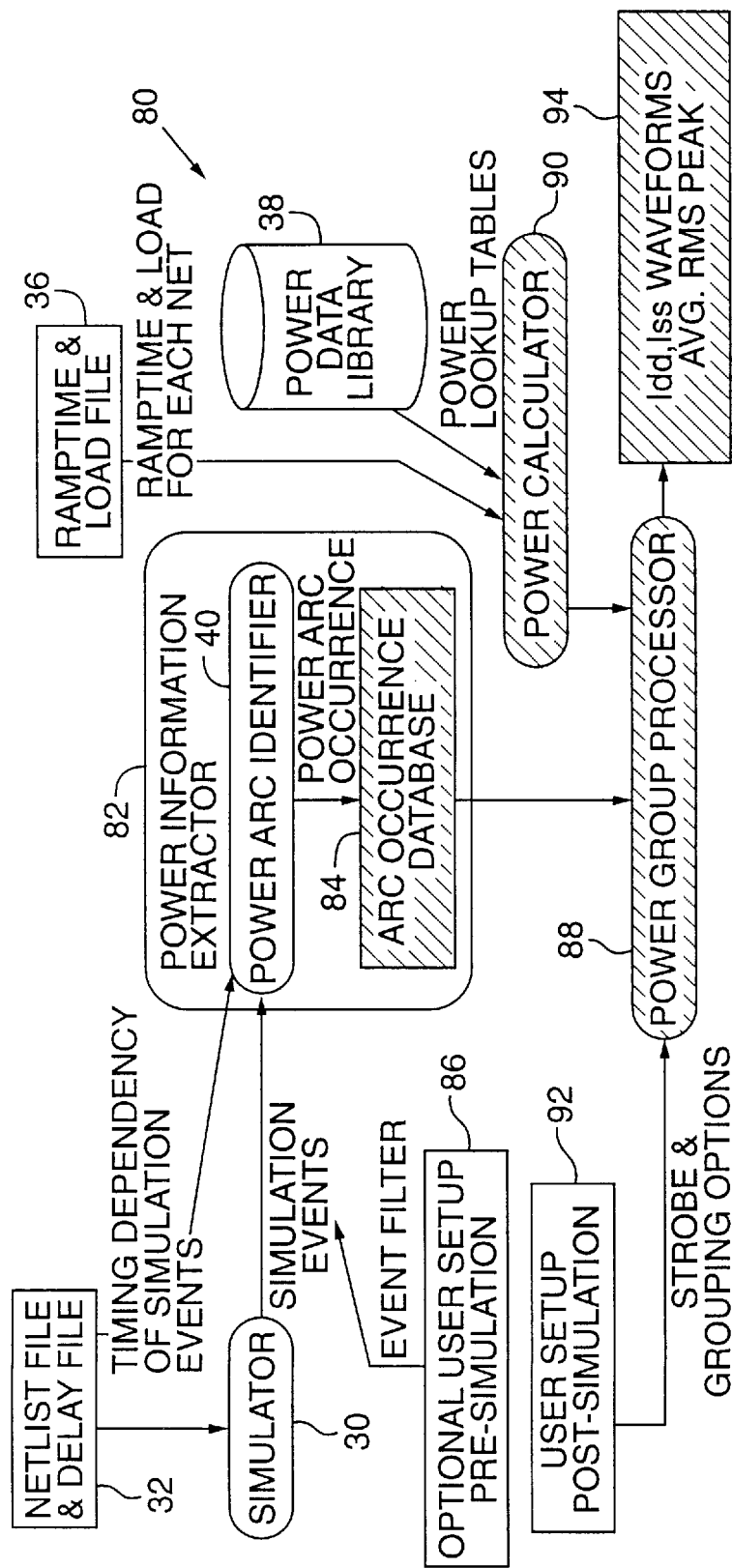
FIG. 6 is a data flow diagram of the power analysis tool according to the invention.

A data flow diagram of the power analysis tool according to the invention is shown generally at 80 in FIG. 6. Common elements between FIG. 3 and FIG. 6 retain common reference numerals. Most common elements include simulator 30, netlist and delay file 32, ramptime and load file 36, power data library 38 and power arc identifier 40. Because those components are described above, a description of each is not repeated hereinafter.

The power analysis tool 80 includes a power information extractor 82. The extractor 82 includes a power arc identifier 40, as in FIG. 3, and an arc occurrence database 84. The arc occurrence database 84, as mentioned above, stores the occurrence time of each power arc as well as the number of occurrences of that particular arc produced by the simulation events generated by simulator 30. The tool also includes an optional user set-up file 86 that allows the user to filter certain simulation events so that these filtered events do not affect the power analysis.

The power information extractor 82 is coupled to a power group processor 88, which reads the contents of the arc occurrence database. Also coupled to the power group processor is a power calculator 90. This power calculator can either take the form of power calculator 42 of the prior art or, as in the preferred embodiment, take the form shown and described hereinafter with reference to FIG. 7. The power calculator 90 provides three atomic waveforms to the power group processor 88: a positive load current waveform, a negative load current waveform, and an internal cell current waveform. These waveforms are generated based on the information stored in the power look-up tables in library 38.

Power group processor 88 is also coupled to a user post-simulation set-up file 92 to receive strobe and grouping options therefrom. The strobe options establish the time frame for the power analysis while the grouping options specify that portion of the design currently being analyzed.

The power group processor 88 provides two combined waveforms to a power group post-processor 94: a Vdd current waveform and a Vss current waveform. These waveforms are processed by the power group post-processor 94 to form average, root-mean-square (RMS) and peak current values for the Vdd and Vss currents.

Figure 7:
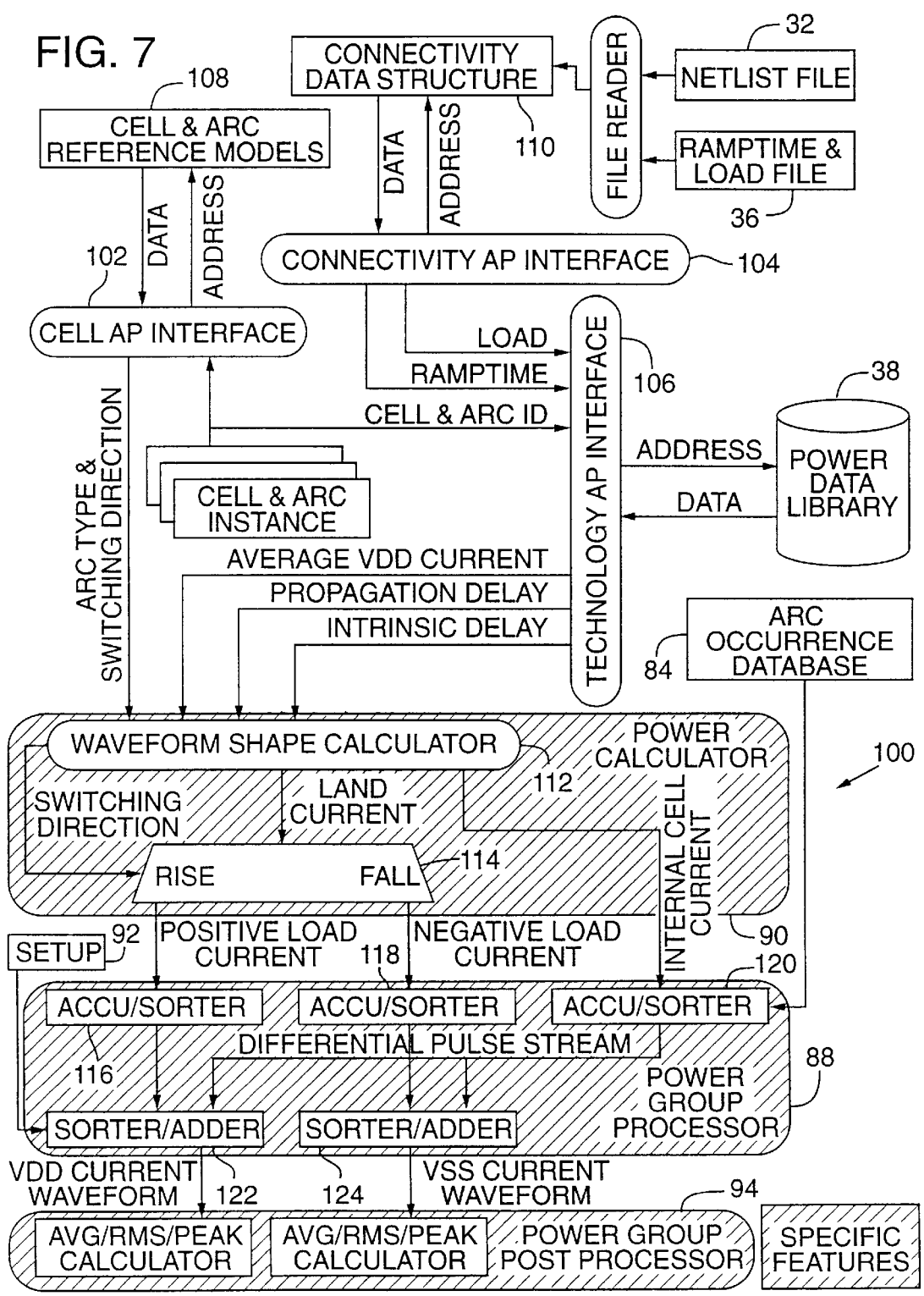
FIG. 7 is a more detailed data flow diagram of the power analysis tool according to the invention.

Referring now to FIG. 7, a more detailed data flow diagram of the power analysis tool according to the invention is shown generally at 100. Again, common elements between the drawings retain common reference numerals.

The data flow diagram shows three additional interfaces heretofore not mentioned: a cell application program interface (API) 102; a connectivity API 104; and a technology API 106. Interface 102 is interposed between the power calculator 90 and cell and arc reference models 108. The cell and arc reference models 108 provide data to the interface 102 describing the arc type and switching direction for a given arc address. The connectivity interface 104 is interposed between a connectivity data structure 110 and the technology interface 106. The connectivity interface 104 provides an address to the connectivity data structure and in response thereto, the connectivity data structure 110 provides data relating to the load and ramptime corresponding to that address. This load and ramptime data is provided to the technology interface 102 along with the corresponding cell and arc identification. The technology interface 106 generates an address based on this data that is provided to the power data library 38. In response to this address, the power data library provides data back to the technology interface 106 that is required by the power calculator 90. That data includes the average Vdd current, the propagation delay, and the intrinsic delay associated with a particular power arc.

All of the input data provided to the power calculator 90 is fed to a waveform shaped calculator 112, which generates a load current waveform, an internal cell current waveform, and a switching direction output based on the arc type and switching direction provided by the cell interface 102 and the average Vdd current, propagation delay and intrinsic delay provided by the technology interface 106. The switching direction output is provided to a multiplexer 114 which multiplexes the load current between a rise output if the switching direction output indicates a rising edge of the power arc or to a fall output if the switching direction output indicates a falling edge on the power arc. The rise output produces a positive load current waveform while the fall output produces a negative load current waveform, which is defined relative to the cell output associated with the power arc. The positive load current waveform, the negative load current waveform, and the internal cell current waveform generated by the power calculator 90 for a given arc are atomic, i.e., they cannot be divided into sub-components. The internal cell currents ($I_{INT}$) is related to the average current ($I_{AVE}$) by the following expression:

$$I_{INT}=I_{AVE}-C\times Vdd \div \Delta t$$

These three atomic current waveforms are used by the power group processor 88 to form two combined current waveforms: the Vdd current waveform and the Vss current waveform, i.e., the current drawn at the two power terminals of the grouped circuit. These three atomic currents are related to these combined currents according to the following relationships:

Vdd current=cell internal current+positive load current
Vss current=cell internal current−negative load current Each of these atomic waveforms is modeled, in the preferred embodiment, as a rectangular pulse, where pulsewidth and pulse height are directly calculated from the static parameters, i.e., ramptime, load, delay, and average Vdd current. Using the above relationships, however, waveforms for complex groups of cells can be calculated in the following way:
1. superimpose all cell internal currents within the group;
2. superimpose all positive load currents;
3. superimpose all negative load currents; and
4. calculate Vdd and Vss currents according to the above relationships.

Steps 1–4 are performed by power group processor 88. The processor includes three accumulators/sorters: the first 116 coupled to the power calculator 90 to receive the positive load current waveforms; a second 118 coupled to the power calculator 90 to receive the negative load current waveforms; and a third 120 coupled to the power calculator 90 to receive the internal cell current waveforms. Each of the accumulator sorters is also coupled to the arc current database 84 to receive the occurrence times of the arcs.

The first accumulator sorter 116 sorts the positive load current waveforms received from the power calculator by their respective occurrence times. Once they are sorted, the accumulator/sorter 116 accumulate or combine the atomic positive load current waveforms to generate a combined positive load current waveform that is provided to a first sorter/adder 122. This combined positive load current waveform represents the super position of all the positive load currents within the user-specified group. Similarly, accumulator sorter 118 sorts based on occurrence time and then accumulates the atomic negative load current waveforms for the arcs associated with the group. The output of the accumulator sorter 118 is a combined negative load current waveform that represents the super position of all the negative load currents within the group. Finally, accumulator/sorter 120 sorts and accumulates the atomic internal cell current waveforms generated by the waveform shape calculator of the power calculator 90. The output of accumulator sorter 120 is a differential pulse stream that is provided to both the sorter/adder 122 and the sorter/adder 124 in order to form the Vdd and Vss currents according to the relationships given above. The first sorter/adder 122 generates a Vdd current waveform for the group as specified by the set-up file 92. Similarly, sorter/adder 124 forms a Vss current waveform. These waveforms then represent the power consumed by the user-specified group of cells.

A power group post-processor 94 is coupled to the power group processor 88 to receive the Vdd current waveform and the Vss current waveform. From these waveforms, the average, root-means-square (RMS) and peak values are calculated for each. These values are calculated naturally on the fly.

Figure 8:
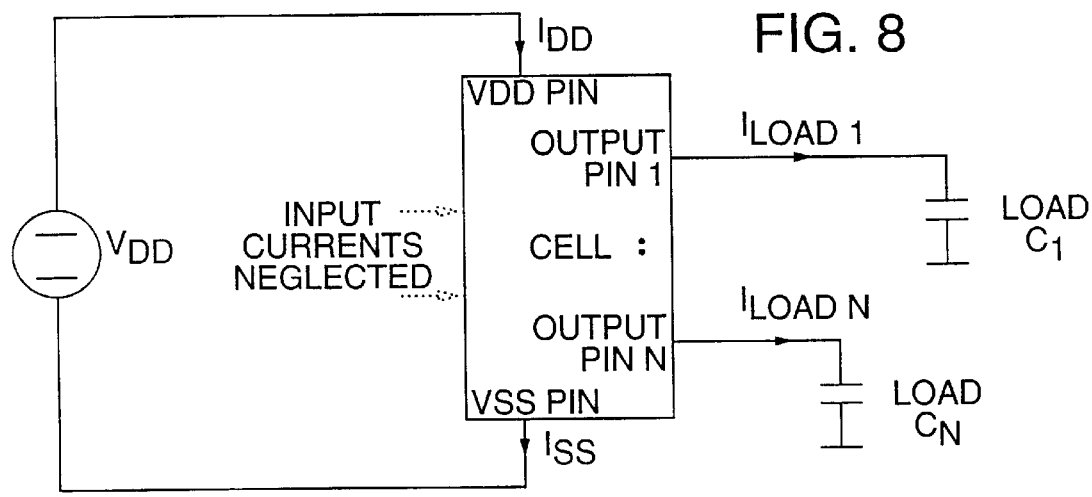
FIG. 8 is a schematic drawing of an N+2 port model of a generic cell.

A more detailed description of the waveforms generated by the power analysis tool is given below. From the library characterization, delay and power prediction, and simulation results extraction, the following information is available for each cell into each arc: event time and ramptime at each input pin and event time, ramptime, and load capacitance at each output pin of the cell. The average current is then a function of the ramptime at the input pin and the effective loading at the output pin of the corresponding arc. The average current, however, is equal to the average current flowing through the cells Vdd pin measured over a fixed period of time, which is longer than the time between the start of the input pin and of the output event. The average current stored in the look-up tables, though, can be used to construct the atomic waveforms for the individual arcs using the timing information and the N+2 port model of the cell (where N is equal to the number of output pins), as shown in FIG. 8.

The Vdd current ($I_{dd}$) is equal to the sum of all occurrence flowing out of the cell, i.e.:

$$I_{dd}=I_{ss}+I_{loadI}\ldots+\ldots I_{loadN}$$

The input currents to the cell are neglected since they are already considered as part of the output currents of the cell.

The individual current waveforms at each output pins is given by:

$$I_{loadI}=C_I\times dV_I \div DT$$

Where $I_{loadI}$ is the load current for the Ith output pin. A simple squarewave model can then be constructed for each output current since the ramptime and voltage swing for each arc is known. The load current is then given by the following:

| | |
|---|---|
| $I_{loadI} = 0$ | before ramp @ output pin I starts |
| $I_{loadI} = CI \times Vdd/ramptime$ @ pin I | from start to end of ramp at output pin I |
| $I_{loadI} = 0$ | after ramp @ output pin I ends |

If the output switches from zero to one, the sign on the load current is positive whereas, if the output switches from one to zero, the sign is negative. The calculation is also valid for glitches with partial voltage swings. A partial voltage swing occurs when the ramp of the glitch is smaller than the required ramptime for a full swing. In the case of glitches, both edges of the glitches with their respective ramptimes must be considered for purposes of calculating a load current.

The difference between the load current and the characterized current (i.e., average current) is the internal cell current, for which the waveform is not characterized. There is several properties of the current behavior, however, from which the internal cell current can be constructed. The first is that the internal current starts flowing after the input event starts. Then, as long as the input ramps up, a short circuit current is drawn by the cell. The load current then dominates after the output starts ramping up. Based on this, a square wave model for the internal cell current can be constructed having the following relations:

| | |
|---|---|
| $I_{cell} = 0$ | before ramp at input pin starts |
| $I_{cell}$ = effective charge/effective time | during effective time |
| $I_{cell} = 0$ | after end of effective time | where:
  effective charge=(average current×simtime)−load charge
  load charge=$C_I$×Vdd at output pin I
where the effective time is measured from the start of the ramp at the input pin to either the end of the ramp at the input pin or the start of the ramp at the output pin, whichever is later.

In the case of transition at arcs, there is no load charge and no output ramp.
Hence:
  effective charge=average current×simtime
where effective time is measured from the beginning to the end of the ramp at the input pin. For glitches, the effective time is measured from the beginning of the first ramp at the input pin to the beginning of the second ramp at the output pin.

The currents flowing through the Vdd and Vss pins can then be obtained from the waveforms $I_{cell}$ and $I_{loadI}$ according to the following relationships. For $I_{loadI}$ having a positive sign, i.e., rising output:

$$I_{dd}=I_{cell}+I_{loadI}$$

$$I_{ss}=I_{cell}$$

whereas for $I_{loadI}$ with negative sign, i.e., the following output:

$$I_{dd}=I_{cell}$$

$$I_{ss}=I_{cell}-I_{loadI}$$

For transaction arcs, this can be simplified to the following:

$$I_{dd}=I_{ss}=I_{cell}$$

Figure 9:
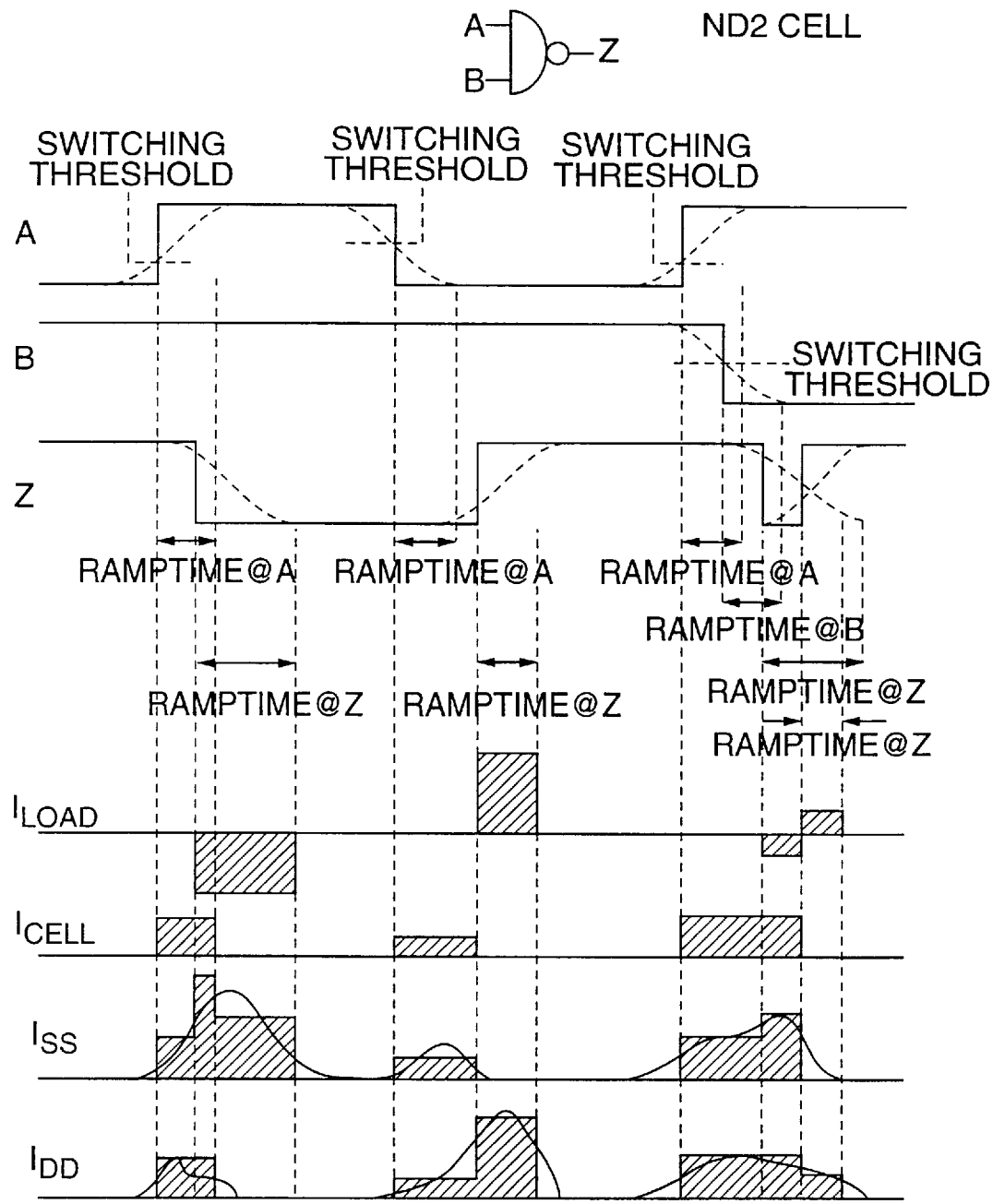
FIG. 9 is a timing diagram of a two-input NAND gate showing the relationship between the various current components that contribute to the power consumed by the gate.
Figure 10A:
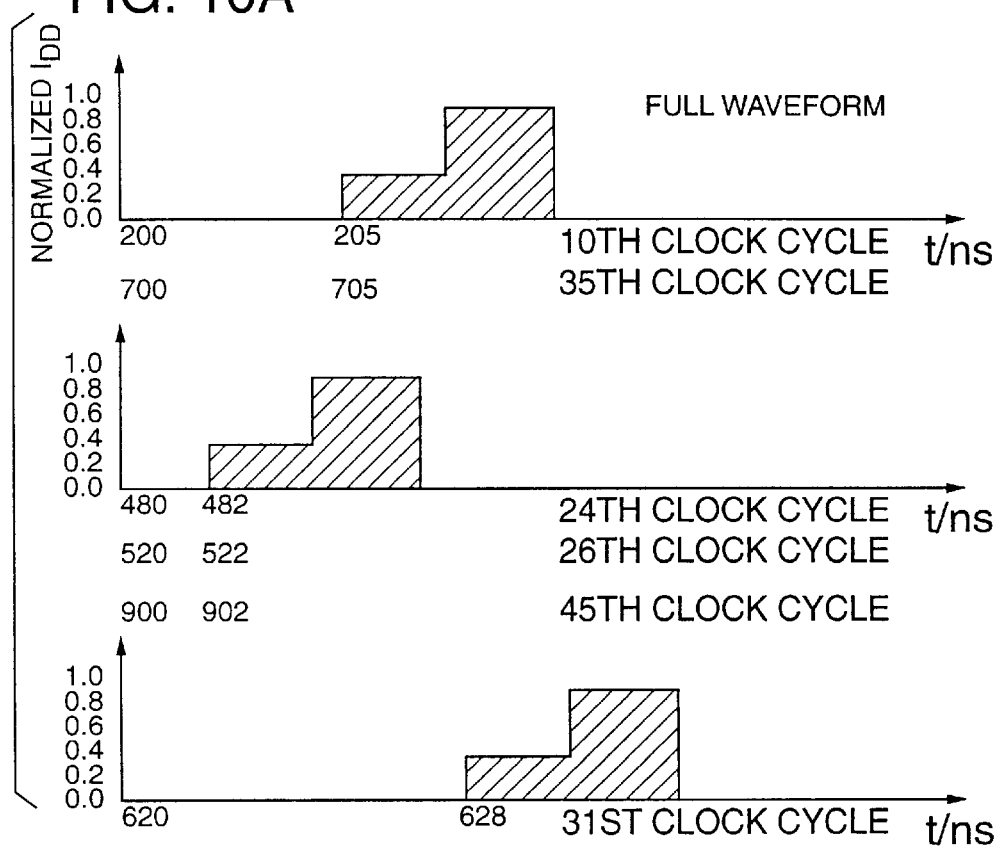
FIG. 10 is a timing diagram of a full waveform and the corresponding expected waveforms according to the invention.
Figure 10B:
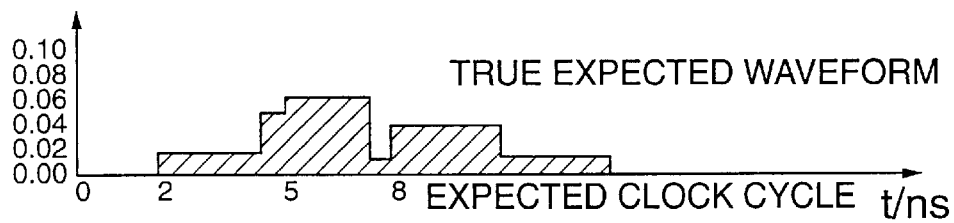
Figure 10C:
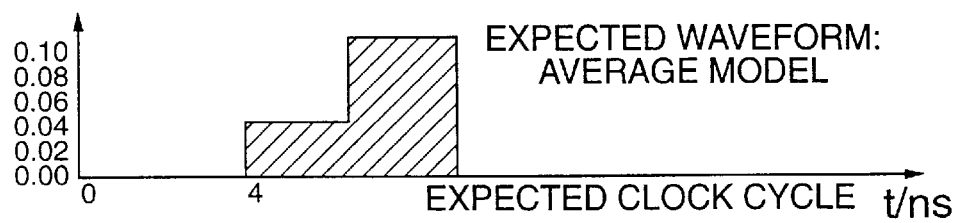
Figure 10D:
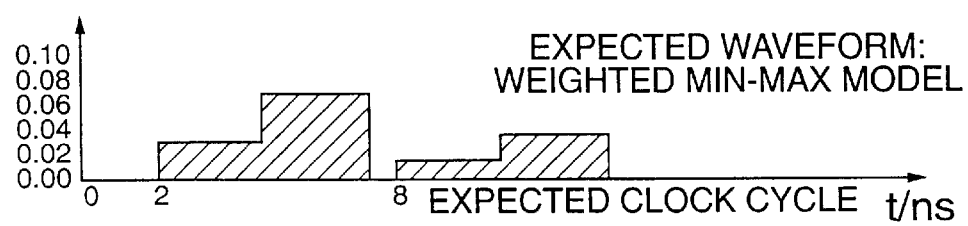

The waveform models for a two input NAND gate under various switching conditions is shown graphically in the timing diagram of FIG. 9. The NAND gate includes two inputs (A, B) and a single output (Z). The resulting load current $I_{load}$, internal cell current $I_{cell}$, the Vss current $I_{ss}$, and the Vdd current $I_{dd}$ resulting from these transitions is shown also therein. These currents are calculated using the expressions given above using the ramptimes shown graphically in FIG. 9 for a given delay in loading capacitance.

These individual currents can then be calculated for each cell in a user-specified group and combined together as described above to produce the Vss and Vdd current waveforms for the grouping of cells. One disadvantage of this approach of using full waveforms for each cell is that it is both memory and computationally intensive.

According to another aspect of the invention, an expected waveform can be constructed which significantly reduces the amount of memory required to represent the waveforms. In essence, the waveforms for each arc are calculated in the same manner as for full waveforms, except they are combined together using a weighted sum to produce a statistical representation of the current rather than an exact waveform. The expected waveforms are discussed further below.

In order to implement these expected waveforms, however, different timing information as compared to full event arcs. The general expected waveform model is an N-tuplet, representing the distribution of possible start times, where N is the number of occurrences of the arc. From this N-tuplet the "true" expected waveform can be constructed. This N-tuplet can be reduced to a triplet including: minimum (Tmin), average (Tavg), and maximum (Tmax) from which a "weighted min/max" expected waveform can be constructed. Alternatively, a single "average" start time can be used to represent the arc from which an "average" expected waveform can be composed.

The weighted min-max model for the expected waveform can be implemented in various ways. In one approach, one waveform is scheduled at Tmin, another at Tmax, each one is then weighted by weighting factors calculated as follows:
  weighting factor for waveform at Tmin=(Tmax−Tavg)÷(Tmax−Tmin)
  weighting factor for waveform at Tmax=(Tavg−Tmin)÷(Tmax−Tmin)

The sum of the weighting factors is one, and the average start time of the two waveforms is Tavg, which needs to be the case for statistical correctness.

An example is given below which illustrates the advantage of using an expected waveform over full waveforms. Again, consider the two-input NAND gate shown in FIG. 9. Assume the following report for the arc A(10)Z(01) of the two-input input NAND gate, embedded in a particular clock domain within the circuit:
  first clock cycle @zero ns no occurrence of this arc
  10th clock cycle@200 ns start time@5 ns
  24th clock cycle@80 ns start time @2 ns
  26th clock cycle@520 ns start time @2 ns
  31st clock cycle@620 ns start time @8 ns
  35th clock cycle@700 ns start time @5 ns
  45th clock cycle@900 ns start time @2 ns
  last clock cycle@1000 ns no occurrence of this arc The full simulation report for this arc would include all of this information. The full waveforms would be correspondingly large. If expected waveforms are used, on the other hand, the simulation report need only give the following information:
  clock cycle time=20 ns
  number of simulated clock cycles=15 ns
  start time of this arc=minimum@2 ns, average@4 ns, and maximum@8 ns
  number of occurrences of this arc=6

The expected waveform according to the true distribution of start times would have the following weighting factors:

$$3\div50=0.06@2 \text{ ns}$$

$$2\div50=0.04@5 \text{ ns}$$

$$1\div50=0.02@8 \text{ ns}$$

The weighting factor for a simplified expected waveform scheduled at the average start time would have the following:

$$6\div50=0.12@4 \text{ ns}$$

In a more accurate weighting min-max model, the weighting factors are:

$$0.12(8-4)\div(8-2)=0.08@2 \text{ ns}$$

$$0.12(4-2)\div(8-2)=0.04@8 \text{ ns}$$

The full as well as the expected waveforms calculating using the above weighting factors is shown in FIG. 10. In FIG. 10A, the full waveform is shown. The true expected waveform is shown in FIG. 10B while the expected waveform that uses the average start time is shown in FIG. 10C and the expected waveform for the weighting min-max model is shown in FIG. 10D. As can be seen from FIG. 10, the weighted min-max model provides a compromise between complexity and accuracy. It follows the general envelope of the possible waveforms, similar to the true expected waveform, without requiring the storage of the actual distribution of start times. The weighted min-max model also preserves the correct average starting time for the arc. The model is also well-suited for probablistic or "static", i.e., vector-independent power analysis, where the minimum and maximum start time come from static timing analysis, and the average start time is estimated or calculated by probablistic timing simulation.

Figure 11:
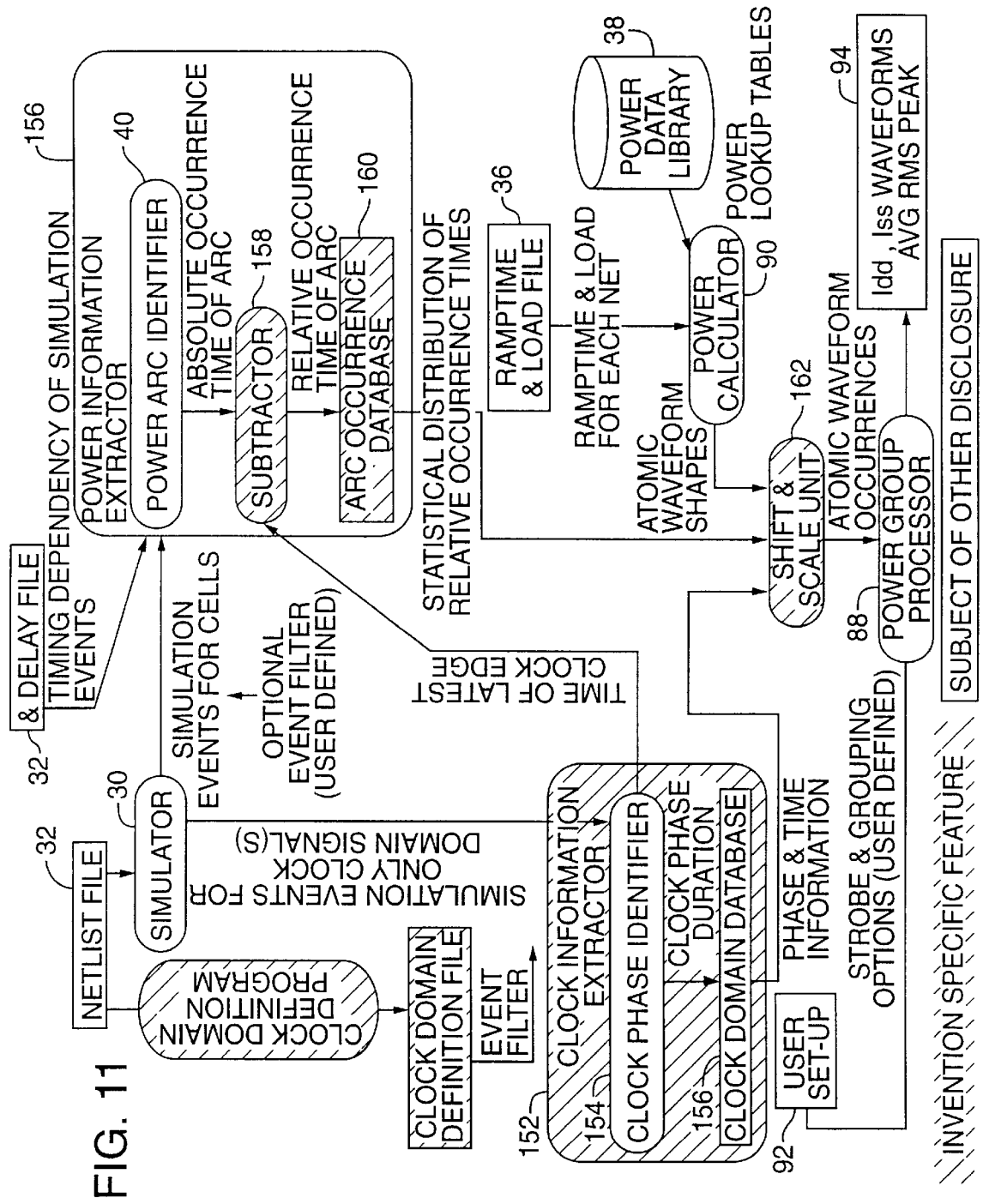
FIG. 11 is a data flow diagram for a power analysis tool that generates an expected waveform according to another aspect of the invention.

Referring now to FIG. 11, the data flow diagram of a power analysis tool having an expected waveform generated according to the invention is shown generally at 150. The data flow diagram of FIG. 11 includes several common elements with that shown in FIG. 6. Those common elements retain common reference numerals and a description of those elements is not repeated hereinafter. The differences between the power analysis tool shown in FIG. 6 and that of FIG. 11 includes a clock information extractor 152 that is coupled to simulator 30 to receive the information on the simulation events for clock domain signals, discussed further below. The extractor 152 includes a clock phase identifier 154 that generates two pieces of information from the simulation events. The first is the time of the latest clock edge. This information is required because the power arc occurrence is measured relative to this clock edge. The other piece of information is the clock phase duration that is provided to a clock domain database 156, which stores the phase and time information of the clock domain signals.

The clock phase identifier 154 is coupled to a power information extractor 156 that, like extractor 82 of FIG. 6, includes a power arc identifier 40. Unlike extractor 82, however, extractor 156 includes a subtractor 158 that takes the absolute occurrence time of an arc generated by the power arc identifier and subtracts the time of the latest clock signal edge produced by the clock phase identifier to produce a relative occurrence time of the arc. This relative occurrence time is used to generate the expected waveforms as compared to the absolute occurrence time of the previous embodiment of the power analysis tool shown in FIG. 6. The relative occurrence time is then provided to an arc occurrence database 160, which stores the statistical distribution of the relative occurrence times for each arc. This information can take many forms including start and end, minimum, maximum and average, and others as discussed above.

The arc occurrence database 160 is coupled to a shift and scale unit 162 to provide the statistical distribution of the relative occurrence times of the power arcs. The phase and time information stored in the clock domain database is also provided to this shift and scale unit 162 along with the atomic waveforms produced by power calculator 90 as discussed above. The shift and scale unit 162 takes these atomic waveforms, shifts them according to their relative occurrence within the clock period and scales them according to the statistical distribution for the arc stored in the arc occurrence database 160. The outcome of the shift and scale unit 162 is an atomic waveform that represents the expected waveform using one of the approaches described above for each arc within a user-defined group. These atomic waveforms are then provided to a power group processor 88 which combines these expected waveforms to form an expected group waveform using the technique described above. Average, RMS and peak currents are then extracted from these group waveforms by power group post-processor 94, which is also described above. The use of the expected waveform according to the invention allows for significant reduction in the amount of memory and processing requirements as compared to the full waveform approach discussed above. The power analysis tool accomplishes this reduction without significantly compromising the accuracy of the power information produced thereby.

Figure 12:
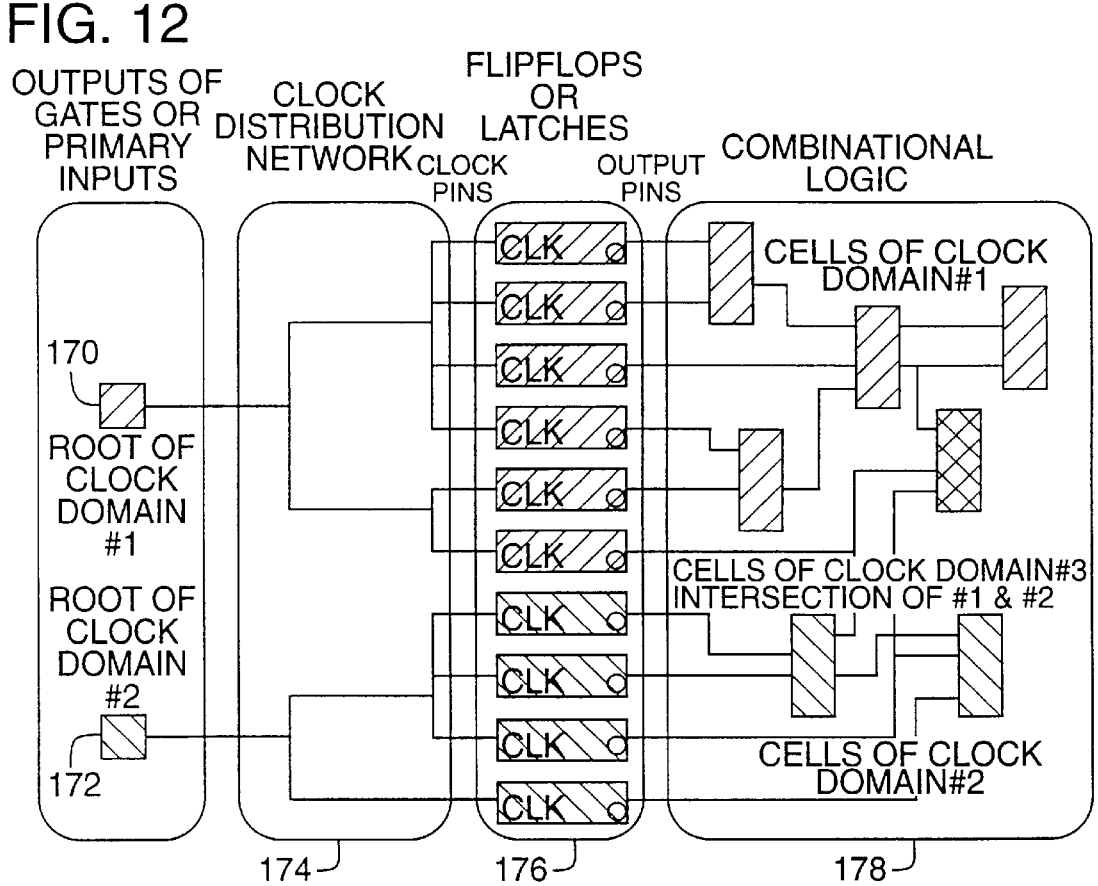
FIG. 12 is a schematic diagram of a generic circuit showing the various clock domains according to the invention.

There is one complication that can occur using expected waveforms where there are multiple clocks within a given circuit design. Most current designs are synchronous in that they all operate or are responsive to a single clock signal, sometimes referred to as a system clock. In some cases, however, cells can be responsive to more than one clock signal. Such a circuit topology is shown in FIG. 12. In FIG. 12, there are two primary clocks: one applied to input 170 and another to input 172. These two inputs can either be primary inputs, i.e., IC pads, or alternatively outputs from a logic gate. Each of these clock signals is then fanned out using a conventional clock distribution network 174 to clock inputs of a plurality of flip-flops or latches 176. The outputs (Q) of these flip-flops or latches are then provided to a combinational logic block 178. Some of the cells within the combinational logic block 178 are responsive only to the first clock signal on input 170. These cells are considered to be within the domain of the first clock, i.e., domain #1. Other cells are exclusively responsive to the second clock applied on input 172. These are said to be within domain #2. The remaining cells, however, are responsive to both the first clock signal and the second clock signal. These cells are within domain #3, which is the inner section of domains 1 and 2.

Figure 13:
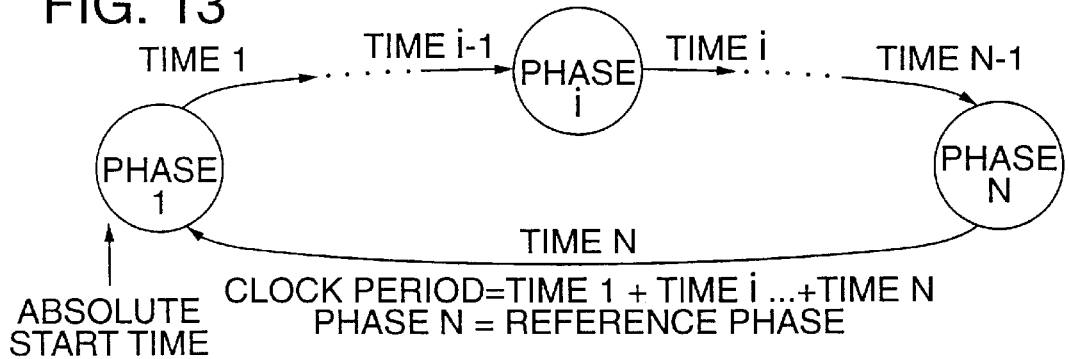
FIG. 13 is a diagram showing a model of a clock domain signal according to the invention.

In order to address this problem, the power analysis tool according to the invention defines a clock period to account for the various combinations of these clock signals within domain #3. The clock period (T) includes a plurality of unique clock phases where the sum of the clock phases for all of the clock phases is equal to the clock period. A general flow diagram of this shown in FIG. 13.

Figure 14:
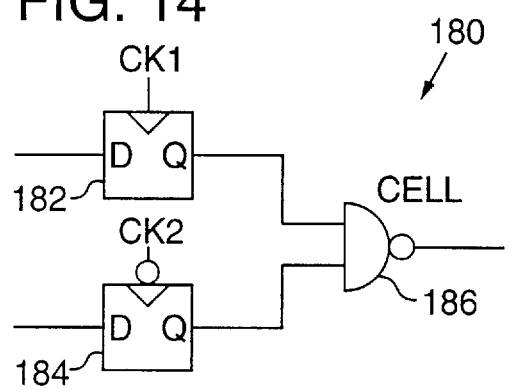
FIG. 14 is a schematic of a specific embodiment of a circuit illustrating the various clock domains according to the invention.

A more concrete example of the clock period definition is shown by way of example. A simple circuit which includes a cell that is responsive to two clock signals is shown in FIG. 14. That circuit 180 includes tow flip-flops 182 and 184 whose outputs are coupled to a two-input NAND gate 186. The first flip-flop 182 is clocked by a first clock signal CK1 while the second flip-flop 184 is clocked by a second clock signal CK2. Thus, the output of the NAND gate 186 is responsive to both clock signals.

Figure 15:
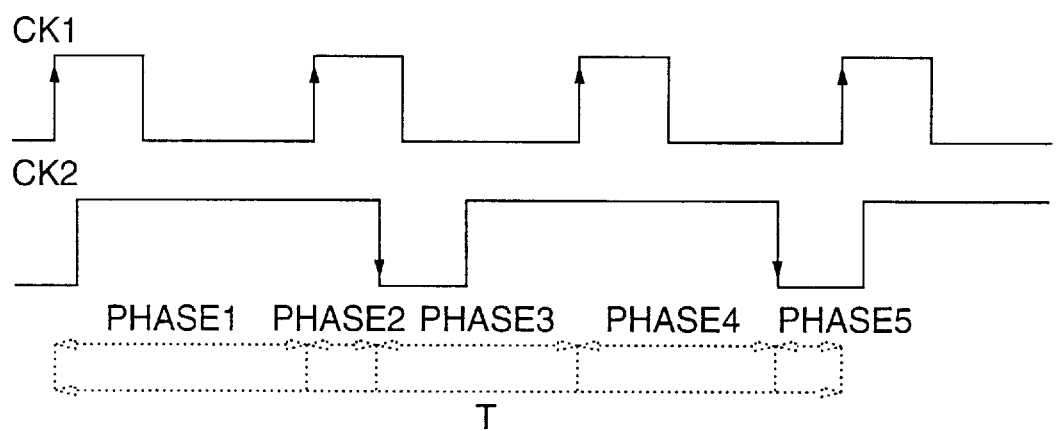
FIG. 15 is a timing diagram of the circuit shown in FIG. 14.

The two clock signals are shown in a timing diagram in FIG. 15. The resulting clock period (T) used by the power analysis tool of FIG. 11 is also shown therein. As is seen in FIG. 15, this overall clock period includes five phases (phase 1 . . . phase 5) where each phase corresponds to a unique combination of the two clock signals. The clock period T can then be replicated to form a continuous clock for purposes of the power analysis. The relative occurrence time of any one power arc then is defined relative to one of these clock phases. The corresponding phase is determined by which clock edge, or edges, give rise to a given power arc. The clock phase identifier 154 determines from the various clock signals which phase of the overall clock period the simulation is currently in and provides the absolute time of the latest clock edge within that phase to the subtractor 158. The subtractor 158 then computes the relative occurrence time of an arc that corresponds to this clock phase.

A typical synchronous design includes only a single clock from which all other clocks are derived. In that case, the clock period for purposes of computing the expected waveforms is the clock period of that system clock. The occurrence times of the power arcs are then measured with respect to that system clock.

Figure 16:
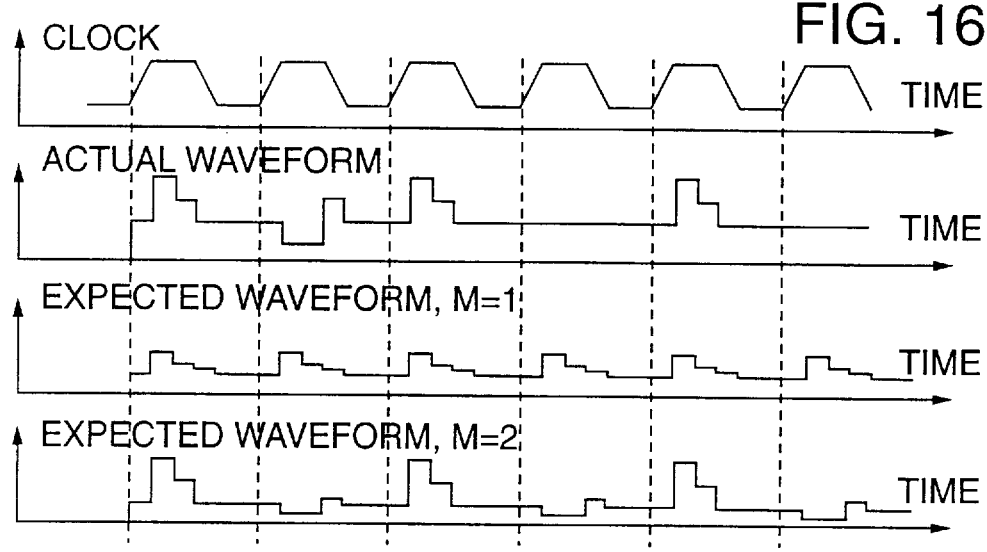
FIG. 16 is a waveform diagram showing the expected waveforms according to the invention.
Figure 17:
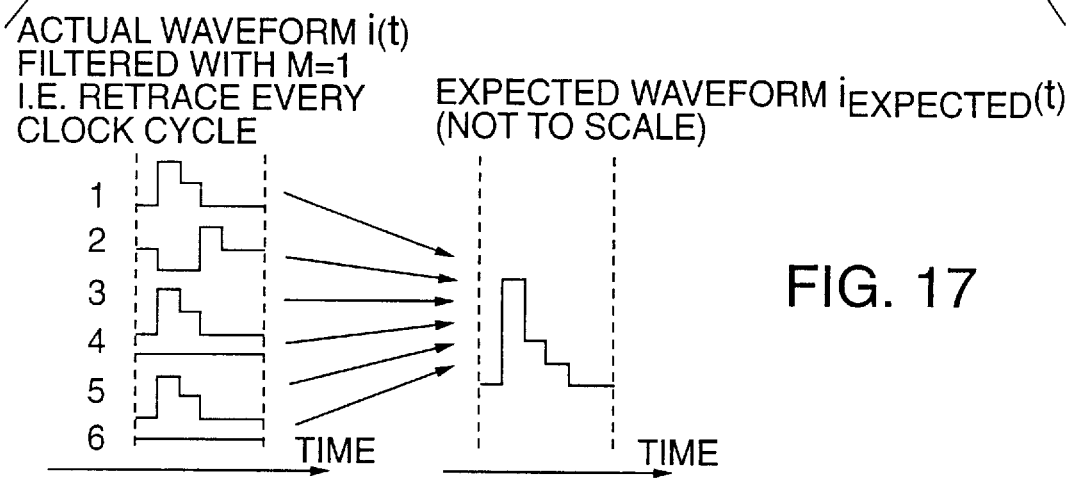
FIG. 17 is a diagram showing four reference periods for M=1 and the resulting expected waveform.
Figure 18:
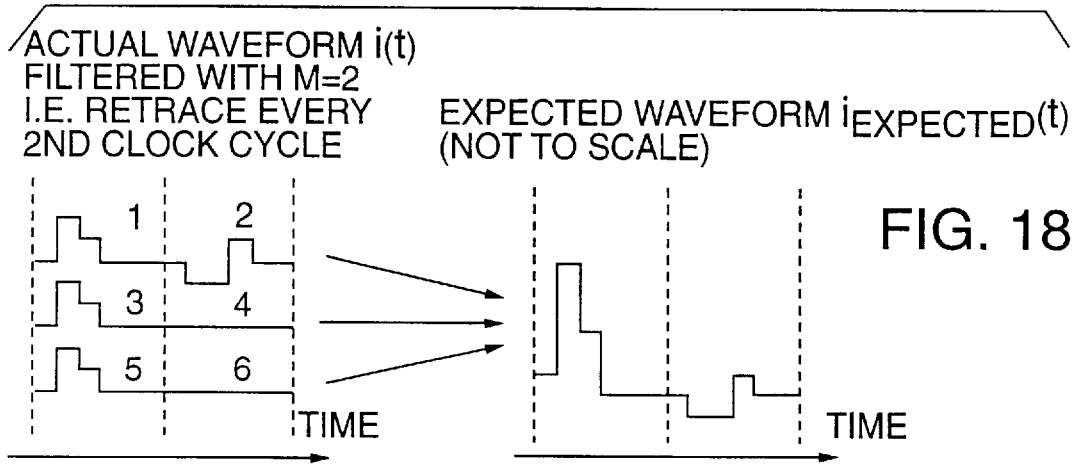
FIG. 18 is a diagram showing four reference periods for M=2 and the resulting expected waveform.

The expected waveform can extend over more than one of these power analysis clock periods. The time over which the expected waveform is accumulated is referred to as the retrace period, patterned after the retrace period of a cathode ray tube (CRT). It is known in the art of signal processing that the longer the retrace period, the closer the expected waveform comes to the original waveform. An illustration of this is shown in FIG. 16 for two cases. The first is where the retrace period is equal to the clock period (i.e., M=1). The second is where the retrace period of the expected waveform is equal to two clock periods (i.e., M=2). As can be clearly seen in FIG. 16, the expected waveform for M=2, where M is equal to the retrace period divided by the clock period, is closer to the actual waveform than the expected waveform for M=1. The factor M need not be greater than 1. The accuracy of the expected waveform, however, significantly suffers for M<1.

Having described and illustrated the principles of the invention in a preferred embodiment thereof, it should be apparent that the invention can be modified in arrangement and detail without departing from such principles. I claim all modifications and variation coming within the spirit and scope of the following claims:

What is claimed is:

1. A memory-efficient method of analyzing power consumption in a circuit design, the method comprising the steps of:

simulating the circuit so as to produce simulation results including a plurality of simulation events;

defining a retrace period;

identifying power arcs associated with a given circuit cell;

determining an arrival time of each of the identified power arcs relative to the retrace period; and forming a combined cell waveform based on the relative arrival times of the identified power arcs.

2. A memory-efficient method of analyzing power consumption in a circuit design according to claim 1 wherein the step of forming a combined cell waveform based on the relative arrival time of the identified power arcs includes:

sorting the identified power arcs based on their relative arrival times within the retrace period; and combining the sorted identified power arcs according to their relative arrival times.

3. A memory-efficient method of analyzing power consumption in a circuit design according to claim 1 wherein the step of forming a combined cell waveform based on the relative arrival time of the identified power arcs includes:

recording the number of times a power arc occurs within a given interval of the retrace period;

forming a atomic waveform for each interval; and forming an expected waveform by weighing atomic waveform according to the recorded number of times that the power arc occurred within the corresponding interval.

4. A memory-efficient method of analyzing power consumption in a circuit design according to claim 1 wherein the step of forming a combined cell waveform based on the relative arrival time of the power arcs includes:

recording the number of times a power arc occurs within a given time within the retrace period;

forming a atomic waveform for each unique time within the retrace period that the power arc occurred; and forming an expected waveform by weighing each atomic waveform according to the recorded number of times that the power arc occurred at the corresponding time within the retrace period.

5. A memory-efficient method of analyzing power consumption in a circuit design according to claim 4 wherein the step of forming an expected waveform by weighing each atomic waveform according to the recorded number of times that the power arc occurred at the corresponding time within the retrace period includes:

determining a weighting factor for each atomic waveform equal to the number of times the power arc occurred at a given time divided by a total number of occurrences of the power arc within the retrace period;

weighing each atomic waveform by the corresponding weighting factor; and combining the weighted atomic waveforms to form an expected waveform.

6. A memory-efficient method of analyzing power consumption in a circuit design according to claim 4 wherein the step of forming a atomic waveform for each unique time within the retrace period that the power arc occurred includes:

determining a delay corresponding to the power arc;

determining a ramptime corresponding to the power arc;

determining an average power supply current corresponding to the power arc; and forming the atomic waveform based on the corresponding delay, ramptime, and average power supply current.

7. A memory-efficient method of analyzing power consumption in a circuit design according to claim 6 wherein the step of forming the atomic waveform based on the corresponding delay, ramptime, and average power supply current includes forming a piece-wise rectangular waveform based on the corresponding delay, ramptime, and average power supply current.

8. A memory-efficient method of analyzing power consumption in a circuit design according to claim 1 wherein the step of defining the retrace period includes:

determining a clock period; and defining the retrace period to be equal to a multiple (M) of the clock period.

9. A memory-efficient method of analyzing power consumption in a circuit design according to claim 8 wherein the multiple M is equal to or greater than 1.

10. A memory-efficient method of analyzing power consumption in a circuit design according to claim 1 wherein the step of determining an arrival time relative to the retrace period for the identified power arcs includes:

defining a clock period; and determining the arriving time relative to the clock period.

11. A memory-efficient method of analyzing power consumption in a circuit design according to claim 10 wherein the step of determining an arrival time relative to the retrace period for the identified power arcs includes:

recording an absolute time;

dividing the absolute time of the power arc by the clock period thereby producing a remainder; and setting the arrival time equal to the remainder.

12. A memory-efficient method of analyzing power consumption in a circuit design according to claim 1 further including:

specifying a group of cells within the circuit;

repeating the identifying, determining, and forming steps for each cell within the user specified group so as to form a combined cell waveform for each cell within the group; and combining the combined cell waveforms to form a combined group waveform representing the power consumption of the group of cells.

13. A power analysis tool for circuit designs comprising:

a netlist file representing the circuit;

a simulator that reads the netlist file, applies a stimulus thereto and records the simulation results, the simulation results including a plurality of simulation events;

means for identifying power arcs associated with a cell within the circuit;

means for determining an arrival time of each of the identified power arcs relative to a retrace period; and means for forming an expected cell waveform based on the relative arrival times of the identified power arcs.

14. A power analysis tool according to claim 13 wherein the means for determining an arrival time of each of the identified power arcs relative to the retrace period includes:

a clock phase identifier coupled to the simulator to receive the simulation results and generating a last edge time equal to the time of a last clock edge within a current clock period; and a subtractor coupled to the simulator to receive the simulation results and to the clock phase identifier to receive the last edge time, the subtractor producing a relative occurrence time equal to a relative occurrence of an identified power arc with respect to the last edge time.

15. A power analysis tool according to claim 14 wherein the means for determining an arrival time of each of the identified power arcs relative to the retrace period includes an arc occurrence database coupled to the subtractor for storing a statistical distribution of the relative occurrence times of the identified power arcs.

16. A power analysis tool according to claim 15 wherein the means for forming a combined cell waveform based on the relative arrival times of the identified power arcs includes:

a power calculator that generates an atomic waveform for each identified power arc; and a shift and scale unit coupled to the arc occurrence database to receive the statistical distribution of the relative occurrence times of the identified power arcs and coupled to the power calculator to receive the atomic waveforms for the identified power arcs, the shift and scale unit shifting and scaling the atomic waveforms according the statistical distribution to produce the combined cell waveform.

17. A power analysis tool according to claim 16 further including:

means for storing a listing of user-specified cells; and a power group processor coupled to the storage means to receive the listing of user-specified cells and coupled to the shift and scale unit to receive combined cell waveforms for each cell specified in the list, the power group processor combining the combined cell waveforms to form a combined group waveform representing the combined power consumption of the group of cells.

18. A power analysis tool according to claim 13 further including means for forming an expected cell Vdd current waveform based on the relative arrival times of the identified power arcs.

19. A power analysis tool according to claim 18 wherein the means for forming an expected cell Vdd current waveform based on the relative arrival times of the identified power arcs includes:

means for forming an expected positive load current waveform;

means for forming an expected internal cell current waveform; and means for forming the expected cell Vdd current waveform based on the expected positive load current waveform and the expected internal cell current waveform.

20. A power analysis tool according to claim 13 further including means for calculating an average Vdd current.

21. A power analysis tool according to claim 13 further including means for calculating a peak Vdd current.

22. A power analysis tool according to claim 13 further including means for forming an expected cell Vss current waveform based on the relative arrival times of the identified power arcs.

23. A power analysis tool according to claim 22 wherein the means for forming an expected cell Vss current waveform based on the relative arrival times of the identified power arcs includes:

means for forming an expected negative load current waveform;

means for forming an expected internal cell current waveform; and means for forming the expected cell Vss current waveform based on the expected negative load current waveform and the expected internal cell current waveform.

24. A power analysis tool according to claim 13 wherein the means for forming an expected cell waveform based on the relative arrival times of the identified power arcs includes means for forming a true expected waveform.

25. A power analysis tool according to claim 13 wherein the means for forming an expected cell waveform based on the relative arrival times of the identified power arcs includes means for forming a weighted min-max expected waveform.

26. A power analysis tool according to claim 13 wherein the means for forming an expected cell waveform based on the relative arrival times of the identified power arcs includes means for forming an average expected waveform.

* * * * *